Patented Dec. 16, 1941

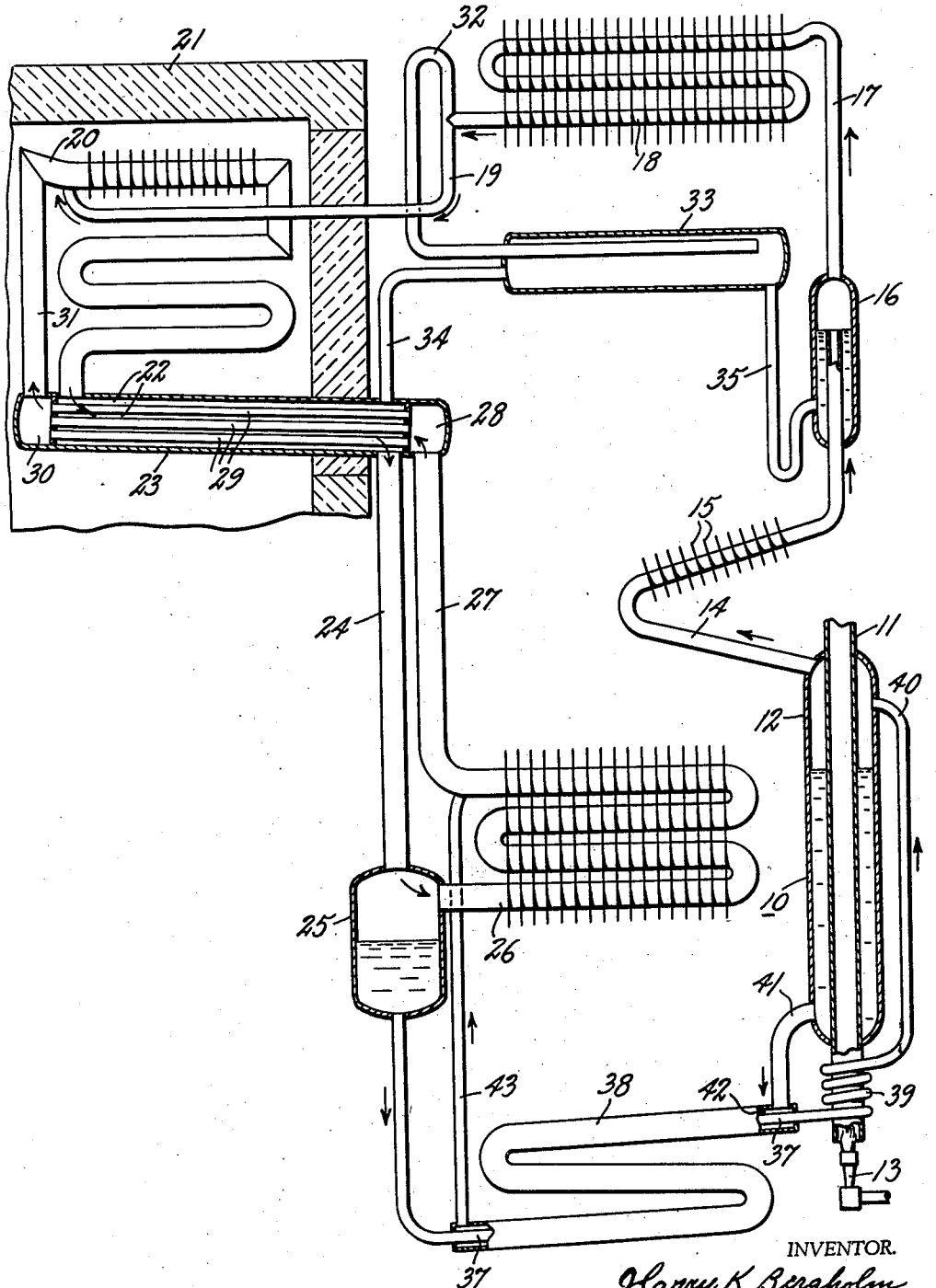

2,266,584

UNITED STATES PATENT OFFICE 2,266,584

REFRIGERATION

Harry K. Bergholm, Stockholm, Sweden, assignor, by mesne assignments, to Servel, Inc., New York, N. Y., a corporation of Delaware Application December 8, 1939, Serial No. 308,118
In Germany December 14, 1938

3 Claims. (Cl. 62—119.5)

My invention relates to refrigeration and more particularly to a continuous absorption refrigeration system containing inert auxiliary fluid to provide equalization of pressure throughout the system.

An object of the invention is to improve the capacity and efficiency of such a system under high load conditions. This is accomplished by trapping refrigerant fluid out of circulation to decrease the average concentration of solution under high load conditions. This results in increased capacity as known. The decrease in concentration of solution introduces a requirement of more rectification of generated vapors. This requirement is met by utilizing the trapped refrigerant fluid for cooling the generated vapors.

Another object of the invention is to carry out the above improvement in connection with known automatic pressure compensation in systems of this type by the use of an auxiliary fluid reservoir, commonly referred to as a pressure vessel. Condensed refrigerant fluid formed in the pressure vessel under high load conditions is trapped out of active circulation to cause the weakening of solution, and this condensate is utilized to take up heat of rectification of generated vapors.

Further objects and advantages of the invention will appear upon consideration of the following description and accompanying drawing forming a part of this specification and of which the single figure shows more or less diagrammatically a refrigeration system embodying the invention.

Referring to the drawing, reference character 10 designates a generator which includes a flue 11 surrounded by a jacket 12. The flue is arranged to be heated in any suitable manner, as by the gas burner 13. A conduit 14 communicates with the upper part of the generator and extends upwardly therefrom. At least a portion of this conduit is provided with heat transfer fins 15, thus forming a rectifier. Conduit 14 extends within a chamber 16 and opens into the upper part of this chamber. A conduit 17 connects the upper end of chamber 16 with the upper end of an air cooled condenser 18.

The lower end of condenser 18 is connected by means of a conduit 19 with the upper end of an evaporator 20 disposed within a refrigerator cabinet 21. The lower end of the evaporator is connected to the space 22 within a gas heat exchanger 23. A conduit 24 connects the other end of space 22 with the upper part of a receptacle 25.

The lower end of an air cooled absorber 26 is also connected to the upper part of receptacle 25, while the upper end of the absorber is connected by means of a conduit 27 with a space 28 formed in one end of the gas heat exchanger 23. Tubes 29, which extend through the space 22, connect the space 28 with a similar space 30 in the other end of the heat exchanger, while a conduit 31 connects this latter space with the upper end of the evaporator 20.

A conduit 32 extends upwardly from the lower end of the condenser 18 and thence downwardly to communicate with one end of a pressure vessel 33. A conduit 34 connects the opposite end of this vessel with the space 22 in the heat exchanger. A conduit 35 connects the lower part of vessel 33 with the chamber 16, this conduit preferably being formed to provide a liquid trap.

A conduit 36 connects the lower part of receptacle 25 with the inner pipe 37 of a liquid heat exchanger 38. The opposite end of pipe 37 is connected to the lower end of a coil 39 which is arranged in heat exchange relation with the flue 11. A conduit 40 connects the upper end of coil 39 with the upper part of generator 12.

The operation of the above described device is as follows:

The generator contains a solution of refrigerant, such as ammonia, dissolved in a liquid absorption medium, such as water. The application of heat to this solution causes the ammonia to be driven off in the form of a gas. Some water is unavoidably vaporized and the mixture of ammonia vapor and water vapor passes from the generator through the conduit 14. This mixture is cooled somewhat by the transfer of heat therefrom through the fins 15 to the atmosphere. The cooling capacity of the fins 15 forming the rectifier is so selected that under certain atmospheric temperature conditions, the cooling effected thereby is sufficient to condense substantially all of the water vapor. The result is that the water vapor is separated from the refrigerant and runs back through the conduit 14 in liquid form to the generator. The substantially pure refrigerant vapor passes to the chamber 16 and thence through the conduit 17 to the condenser 18.

In the condenser the temperature of the gaseous refrigerant is reduced by virtue of the transfer of heat therefrom through the condenser fins to the atmosphere. The cooling capacity of the condenser is so chosen that, under certain temperature conditions, all of the refrigerant vapor will be liquefied in the evaporator.

The liquid refrigerant flows from the lower end of the condenser through the conduit 19 to the upper end of the evaporator 20, where it meets an inert gas, such as hydrogen, which is supplied through the conduit 31. In accordance with Dalton's law, the partial pressure of the ammonia is reduced due to the presence of the hydrogen, with the result that the ammonia evaporates and cools the evaporator and the space within the refrigerator cabinet 21. The gaseous mixture of ammonia and hydrogen, formed in the evaporator, passes therefrom into the space 22 of the heat exchanger 23 and thence through the conduit 24 into the receptacle 25, and enters the lower end of the absorber 26. In the absorber this gaseous mixture is brought into intimate contact with weak absorption liquid supplied through the conduit 43, with the result that the ammonia is absorbed while the hydrogen, being substantially insoluble in water, passes through the absorber, the conduit 27, the space 28, the tubes 29, the space 30 and the conduit 31 to the upper end of the evaporator. The heat resulting from the absorption is transferred to the atmosphere by means of the fins on the absorber.

The strong solution formed in the absorber flows from the lower end thereof into receptacle 25, whence it passes through the conduit 36 and pipe 37 of the liquid heat exchanger 38 to the coil 39. The application of heat to the strong solution in the coil 39 causes the formation of gas bubbles therein which lift the unvaporized portion through the conduit 40 to the upper part of the generator.

As previously described, the application of heat to the solution in the generator drives off ammonia gas so that, by the time the solution has reached the lower end of the generator it is weak. This weak solution flows through conduit 41, space 42 in the liquid heat exchanger 38 and conduit 43 to the upper end of the absorber 26.

Should there be an increase in the temperature of the air relied upon to cool the rectifier 15, condenser 18 and absorber 26, a portion of the refrigerant will pass through the condenser 18 without being liquefied. This vaporous ammonia flows through the conduit 32 to the vessel 33, which, under normal operating conditions, is filled with substantially pure hydrogen. The introduction of the ammonia into the vessel 33 displaces hydrogen therefrom, which flows through the conduit 34 and enters the evaporator-absorber circuit. The result is that the pressure in the system is increased, thus enabling the refrigerant in the condenser to be liquefied at a higher temperature.

The surface of the vessel 33 transfers heat to the atmosphere and becomes, in effect, an auxiliary condenser wherein vaporous refrigerant is liquefied. The liquid ammonia flows through the conduit 35 to the chamber 16, where it is in heat exchange relation with the vapor flowing through conduit 14. The presence of the liquid refrigerant in chamber 16 serves to cool the gaseous mixture in the pipe 14, with the result that the water vapor is liquefied. Refrigerant vaporized in the chamber 16 passes therefrom through the conduit 17 back to the condenser. Should there be more refrigerant supplied to the chamber 16 than evaporates therein, the excess will overflow the upper end of conduit 14 and return to the generator.

As is well known, the capacity of the system is increased if the concentration of the solution is reduced. This is accomplished in the present apparatus by the removal of the refrigerant, which is collected in the chamber 16, from the normal cycle. In other words, the refrigerant in the chamber 16 is prevented from reaching the absorption medium in the generator 10 and the absorber 26, and consequently the concentration of this solution is reduced.

When the air temperature again falls to normal, gaseous refrigerant ceases to issue from the lower end of the condenser and hence no more ammonia gas is supplied to the vessel 33. The liquid ammonia present in the chamber 16 continues to evaporate and thus reenters the main cycle and increases the average concentration of the absorption solution. Due to the fact that the condenser is now able to liquefy all of the refrigerant supplied thereto, the pressure in the system falls and the apparatus continues to operate in a normal manner.

While I have shown a more or less specific embodiment of my invention, it is to be understood that this has been done for the purpose of illustration only, and is not to be considered as limiting the scope of my invention, which is to be determined by the following claims.

What is claimed is:

1. In absorption refrigerating apparatus, a circuit for absorption liquid including an absorber and a generator, a condenser, a circuit for inert pressure equalizing gas including an evaporator and said absorber, a vessel connected to said condenser and to said gas circuit and serving as a storage chamber for a reserve supply of said inert gas, and conduit means forming a path of flow for vapor from said generator to said condenser, and a path of flow for condensed liquid from said chamber to said liquid circuit, said paths of flow being at least in part in heat exchange relation.

2. In absorption refrigerating apparatus, a generator, a condenser, a circuit for inert pressure equalizing gas including an evaporator and an absorber, a vessel connected to said condenser and to said gas circuit and serving as a storage chamber for a reserve supply of said inert gas, and conduit means forming a path of flow for vapor from said generator to said condenser, and a path of flow for condensed liquid from said chamber to said generator, said paths of flow being at least in part in heat exchange relation.

3. In absorption refrigerating apparatus, a circuit for absorption liquid including an absorber and a generator, a condenser, a circuit for inert pressure equalizing gas including an evaporator and said absorber, a vessel connected to said condenser and to said gas circuit and serving as a storage chamber for a reserve supply of said inert gas, and conduit means including a liquid cooled rectifier for conducting vapor from said generator to said condenser and condensed liquid from said chamber to said liquid circuit.

HARRY K. BERGHOLM.